(12) United States Patent
Sasaki

(10) Patent No.: US 7,283,324 B2
(45) Date of Patent: Oct. 16, 2007

(54) DISK DRIVE DEVICE AND METHOD HAVING STABILIZER PLATE LOCATED BETWEEN DISKS

(75) Inventor: Yasutaka Sasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 11/086,593

(22) Filed: Mar. 21, 2005

(65) Prior Publication Data

US 2005/0286162 A1 Dec. 29, 2005

(30) Foreign Application Priority Data

Jun. 28, 2004 (JP) .............................. 2004-189954

(51) Int. Cl.
*G11B 33/14* (2006.01)
*G11B 5/48* (2006.01)

(52) U.S. Cl. .................................. 360/97.03
(58) Field of Classification Search ............. 360/97.02, 360/97.03, 98.01
See application file for complete search history.

(56) References Cited

U.S. PATENT DOCUMENTS

| | | | |
|---|---|---|---|
| 6,271,987 B1* | 8/2001 | Allsup et al. ............. | 360/97.03 |
| 6,449,119 B1* | 9/2002 | Hashizume et al. ..... | 360/97.03 |
| 6,462,901 B1* | 10/2002 | Tadepalli ................. | 360/97.03 |
| 6,882,501 B2* | 4/2005 | Machcha et al. ........ | 360/97.03 |
| 6,903,899 B2* | 6/2005 | Sakata et al. ............ | 360/97.03 |
| 6,989,959 B2* | 1/2006 | Chang et al. ............ | 360/97.02 |
| 2002/0135933 A1* | 9/2002 | Harrison et al. ......... | 360/97.02 |
| 2002/0196581 A1* | 12/2002 | Tsang et al. ............. | 360/97.02 |
| 2003/0202276 A1* | 10/2003 | Smith ...................... | 360/97.02 |
| 2004/0252406 A1* | 12/2004 | Sorrell et al. ............ | 360/97.02 |

FOREIGN PATENT DOCUMENTS

| | | |
|---|---|---|
| JP | 9-22569 | 1/1997 |
| JP | 2000-322870 | 11/2000 |
| JP | 2000-331460 | 11/2000 |
| JP | 2002-157858 | 5/2002 |

\* cited by examiner

*Primary Examiner*—Jefferson Evans
(74) *Attorney, Agent, or Firm*—Foley & Lardner LLP

(57) ABSTRACT

A plurality of disks are supported and rotated by a spindle motor in a case. A stabilizer is located in the case. The stabilizer has a stabilizer plate which is located between the disks and opposed to surfaces of the disks with gaps therebetween and a plurality of support portions which extend from the stabilizer plate outside the disks, are sandwiched between a bottom wall and a cover of the case, and support the stabilizer plate. A method of assembling the stabilizer plate includes positioning the stabilizer plate over a first magnetic disk and securing a support portion to a bottom wall or surface of the case, positioning a second magnetic disk over the stabilizer plate and then securing an upper cover of the case to the support portion.

9 Claims, 6 Drawing Sheets

DISK DRIVE DEVICE AND METHOD HAVING STABILIZER PLATE LOCATED BETWEEN DISKS

CROSS-REFERENCE TO RELATED APPLICATIONS

This application is based upon and claims the benefit of priority from prior Japanese Patent Application No. 2004-189954, filed Jun. 28, 2004, the entire contents of which are incorporated herein by reference.

BACKGROUND OF THE INVENTION

1. Field of the Invention

This invention relates to disk drive devices, such as magnetic disk devices, provided with disks that rotate at high speeds and to a method of assembling the disk drive device.

2. Description of the Related Art

In general, a magnetic disk device comprises a case in which are arranged magnetic disks in the case, a spindle motor that supports and rotates the disks, a carriage assembly supporting magnetic heads, a voice coil motor for driving the carriage assembly, a substrate unit, etc.

The spindle motor has a cylindrical hub, and a plurality of magnetic disks and spacer rings are stacked on the hub. The disks and the spacer rings are held on the outer periphery of the hub by a disk clamper that is attached to the distal end of the hub.

In the magnetic disk device of this type, the rotational speed of the magnetic disks is high in order to ensure high-speed data processing. To attain this, many researches have recently been made of high-rotation magnetic disk devices. When the magnetic disks rotate at high speed, however, airflows are generated in the direction of rotation of the disks, and their disturbance or turbulence causes a phenomenon called disk flutter such that the disks vibrate. If this occurs, the accuracy of positioning of the magnetic heads with respect to the disks become worse, thus it is difficult to improve recording density.

In order to solve the above problem, a magnetic disk device with a shroud is proposed in Jpn. Pat. Appln. KOKAI Publication No. 2000-322870, for example. The shroud serves to smooth airflows in the circumferential direction of disks that are produced as the disks rotate. The shroud is in the form of a circular arc that surrounds the outer periphery of the disks. Comb-like teeth are set up on a shroud-free peripheral surface. These teeth are interposed between the disks so as to extend from the outermost periphery of the disks toward the inner periphery.

In incorporating the shroud in the magnetic disk device constructed in this manner, however, the shroud must be laterally inserted into the space between the magnetic disks. Thus, assembling the device is difficult, and its manufacturing processes are complicated.

BRIEF SUMMARY OF THE INVENTION

According to an embodiment of the invention, there is provided a disk drive device having a case, a bottom wall or surface and a cover. A motor having a rotatable hub is mounted in the case. Also mounted in the case are a plurality of disks which are individually supported and rotated by the motor; a head which read/write information for disks; and a stabilizer. The stabilizer has a stabilizer plate located between the disks and opposed to surfaces of the disks with gaps therebetween and a plurality of support portions which extend from the stabilizer plate outside the disks. The support portions are sandwiched between the bottom wall and the cover of the case, and support the stabilizer plate.

In accordance with embodiments of the invention, there is provided a disk drive device which includes a case having a bottom surface and a cover; a motor having a rotatable hub and located in the case; a plurality of disks which are supported on the hub and rotated by the motor; a plurality of heads corresponding to recordable/readable surfaces of the plurality of disks, the plurality of heads reading/writing information for the plurality of disks; and a stabilizer having a stabilizer plate located between adjacent ones of the plurality of disks and opposed to surfaces of the adjacent ones of the plurality of disks with gaps therebetween and a plurality of support portions which extend from the stabilizer plate outside the plurality of disks, the plurality of support portions being sandwiched between the bottom surface and the cover of the case, and supporting the stabilizer plate.

In accordance with another embodiment of the invention, there is described a method of assembling a disk drive device comprising: providing a case having a bottom surface, a spindle motor and a hub in the case, the spindle motor secured to the hub for rotational movement; mounting a first magnetic disk to the hub; positioning a stabilizer over the first magnetic disk and mounting a support portion of the stabilizer to the bottom surface of the case; mounting a second magnetic disk to the hub; and mounting a cover onto the support portion.

In accordance with still another embodiment of the invention, there is taught a method of protecting magnetic disks in a disk drive apparatus which includes providing a stabilizer plate between a first and second magnetic disk, the first and second magnetic disk supported for rotational motion about a hub of a spindle motor, and each of the first and second magnetic disk having a no-data recording region and a data recording region; forming the stabilizer plate to have a first region, for positioning adjacent the no-data recording region and a second region for positioning adjacent the data recording region; the first region being sufficiently thicker than the second region so as to prevent the second region of the stabilizer plate from touching the data recording region of the first and second disks; and positioning the stabilizer plate between the first and second magnetic disk such that the first region is positioned adjacent the no-data recording region and the second region is positioned adjacent the data recording region.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
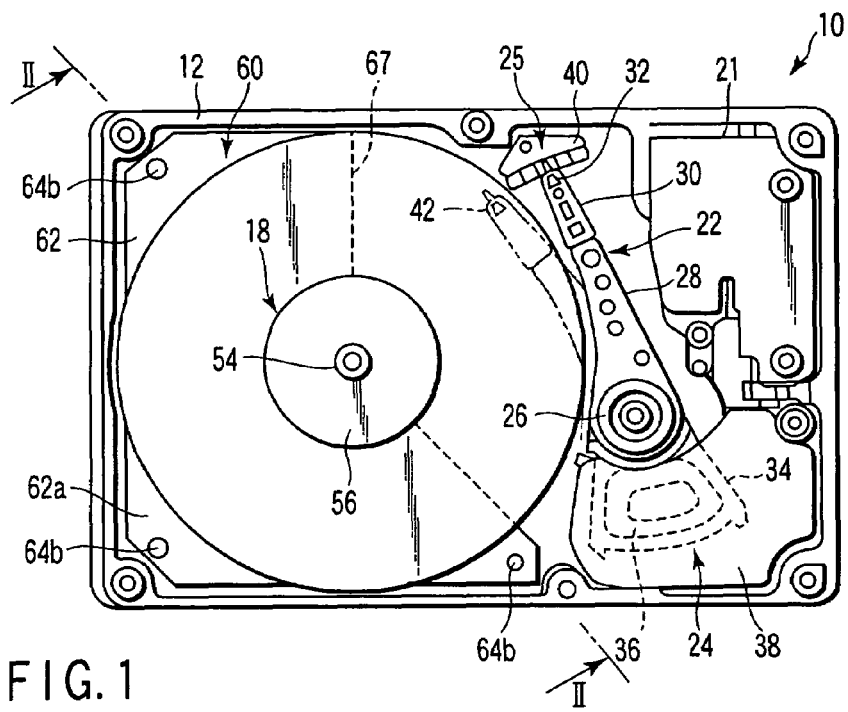
FIG. 1 is a plan view showing a hard disk drive (hereinafter referred to as an HDD) according to a first embodiment of the invention.
Figure 3:
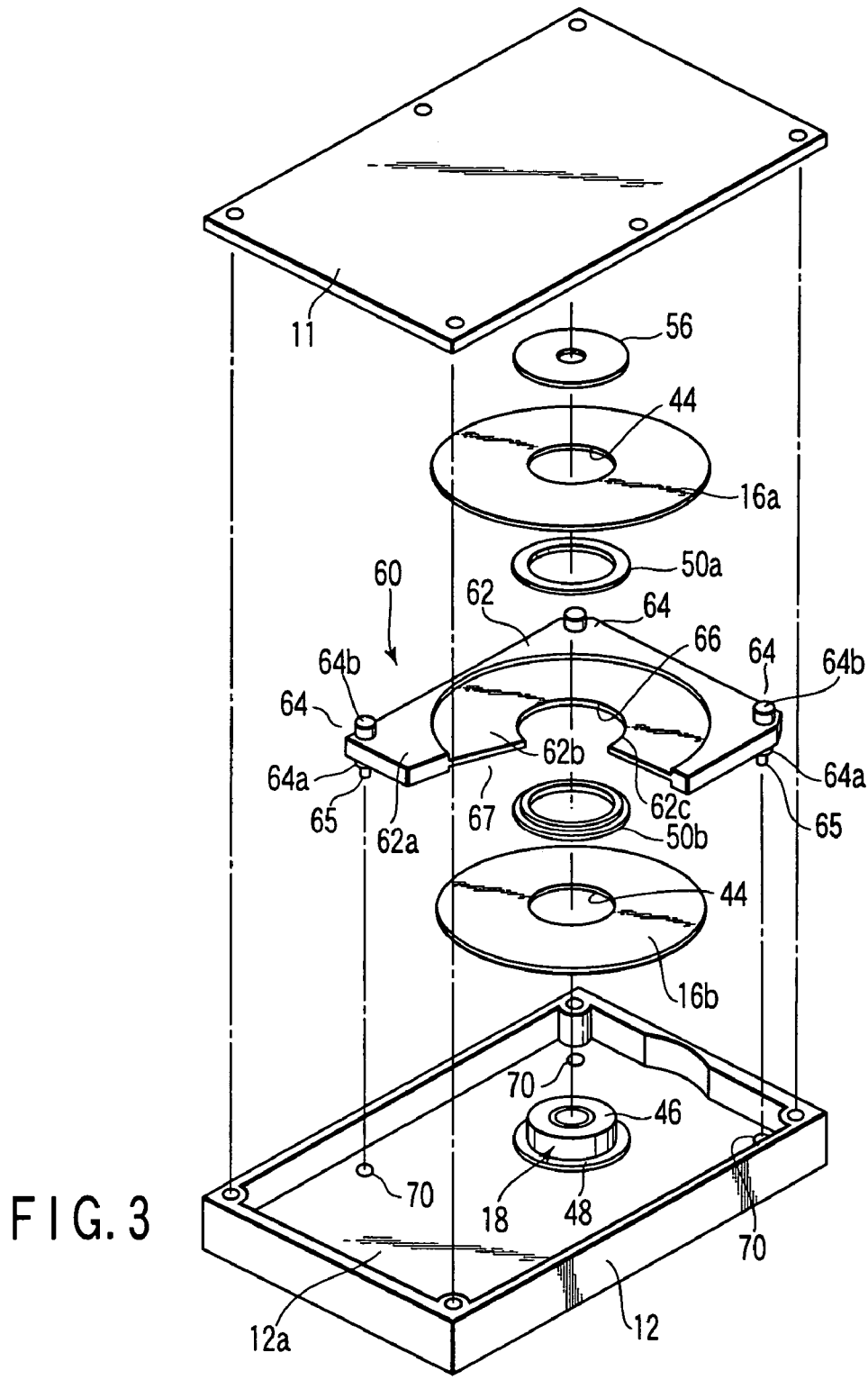
FIG. 3 is an exploded perspective view showing the HDD.

HDDs as disk drive devices according to embodiments of this invention will now be described in detail with reference to the accompanying drawings. As shown in FIGS. 1 and 3, an HDD according to a first embodiment comprises a case 10. The case 10 has a base 12 and a top cover 11. The base 12 is in the form of an open-topped rectangular box that has a rectangular bottom surface 12a. The top cover 11 is fastened to the base with screws and closes a top opening of the base.

Arranged in the case 10 are a spindle motor 18 that is mounted on the bottom surface 12a of the base 12 and two magnetic disks 16a and 16b that are supported and rotated by the spindle motor. The case 10 contains magnetic heads, a carriage assembly 22, and a voice coil motor (hereinafter referred to as a VCM) 24. The magnetic heads are used to record and reproduce information to and from the disks 16a and 16b. The carriage assembly 22 supports the magnetic heads for movement with respect to the disks 16a and 16b. The VCM 24 rotates and positions the carriage assembly. The case 10 further contains a ramp load mechanism 25 and a substrate unit 21 having a preamplifier and the like. The ramp load mechanism 25 holds each magnetic head in an off position away from each magnetic disk when the head is moved to the outermost periphery of the disk. A printed circuit board (not shown) that controls the operations of the spindle motor 18, VCM 24, and magnetic heads through the substrate unit 21 is screwed to the outer surface side of the bottom surface 12a of the base 12.

The carriage assembly 22 comprises a bearing portion 26 fixed on the bottom surface 12a of the base 12 and four arms 28 extending from the bearing portion. The arms 28 extend parallel to the respective surfaces of the magnetic disks 16a and 16b in the same direction from the bearing portion 26 and are situated at given intervals from one another. The carriage assembly 22 is provided with suspensions 30 each in the form of an elongated plate that can be deformed elastically. Each suspension 30 is formed of a leaf spring, the proximal end of which is fixed to the distal end of its corresponding arm 28 by spot welding or adhesive bonding and extends from the arm. Each suspension 30 may be formed integrally with its corresponding arm 28.

A magnetic head 32 is mounted on an extended end of each suspension 30. The head 32 has a substantially rectangular slider and a recording/reproducing MR (magnetic resistance) head formed on the slider and is fixed to a gimbals portion on the distal end portion of the suspension 30. Each two of four magnetic heads 32 that are mounted individually on the suspensions 30 are opposed to each other so as to be adjacent both sides of each magnetic disk.

The carriage assembly 22 has a support frame 34 that extends in the opposite direction from the bearing portion 26 with respect to the arms 28. The support frame supports a voice coil 36 that constitutes a part of the VCM 24. The support frame 34 is molded from synthetic resin and formed integrally on the outer periphery of the voice coil 36. The coil 36 is situated between a pair of yokes 38 that are fixed on the base 12. The voice coil 36 forms the VCM 24 in conjunction with the yokes and a magnet (not shown) that is fixed to one of the yokes. When the voice coil 36 is energized, the carriage assembly 22 rocks around the bearing portion 26, whereupon the magnetic heads 32 are moved and positioned onto desired tracks of the magnetic disks 16a and 16b. The carriage assembly 22 and the VCM 24 constitute a head actuator.

The ramp load mechanism 25 includes a ramp 40 and tabs 42. The ramp 40 is provided on the bottom surface 12a of the base 12 and located outside the magnetic disks 16a and 16b. The tabs 42 extend individually from the respective distal ends of the suspensions 30. As the carriage assembly 22 rocks so that the magnetic heads 32 move to the off position outside the disks 16a and 16b, the tabs 42 engage a ramp surface of the ramp 40, and is then pulled up by the inclination of the ramp surface. Thereupon, the magnetic heads 32 are unloaded.

Figure 2:
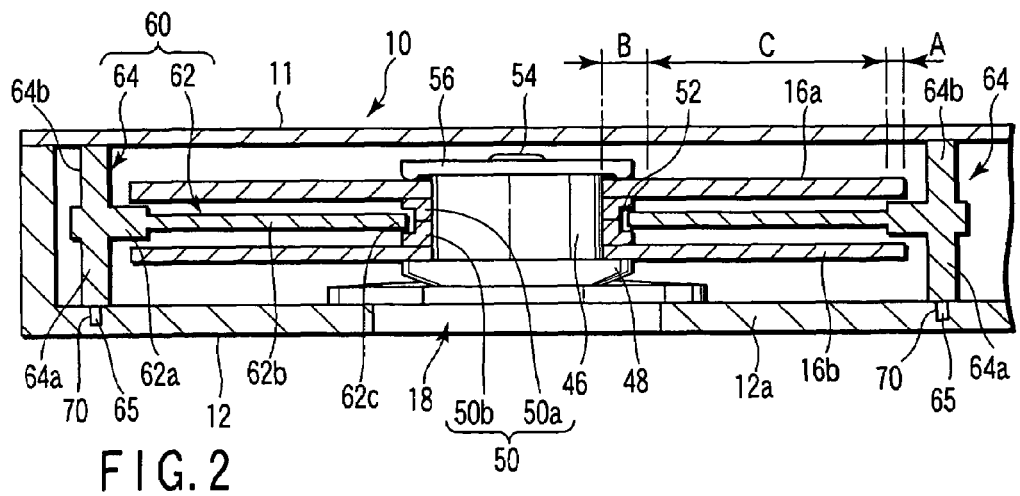
FIG. 2 is a sectional view of the HDD taken along line II-II of FIG. 1.

Each of the magnetic disks 16a and 16b is formed having a diameter of 65 mm (or 2.5 inches) and has a center hole 44. As seen in FIG. 2, each of the upper and lower surfaces of each magnetic disk has a first no-data recording region A situated at its outer peripheral edge portion, a second no-data recording region B situated at its inner peripheral edge portion, and a data recording region C situated between the first and second no-data recording regions.

The spindle motor 18 comprises a hub 46 that serves as a rotor. The two disks 16a and 16b are coaxially stacked on the hub 46 and arranged at a given space in the axial direction of the hub. The disks 16a and 16b are rotated with the hub 46 at a given speed by the motor 18.

More specifically, the hub 46 of the spindle motor 18 is in the form of a closed-top cylinder. The hub 46 is rotatably supported on a spindle by a bearing (not shown). A flange-shaped disk receiving portion 48 is formed on the outer periphery of the lower end of the hub 46. The two magnetic disks 16a and 16b are fitted on the outer peripheral surface of the hub 46 that is passed through their center holes 44, and are placed on the disk receiving portion 48. A spacer ring 50 is fitted on the hub 46 and sandwiched between the disks 16a and 16b. The ring 50 is in contact with the respective second no-data recording regions B of the disks 16a and 16b. The ring 50 is formed by stacking together first and second rings 50a and 50b. A groove 52 is formed on the outer periphery of the spacer ring 50, extending throughout its circumference.

A disk-shaped disk clamper 56 is fastened to the upper end face of the hub 46 by a screw 54. The outer peripheral portion of the clamper 56 engages the second no-data recording region B of the upper magnetic disk 16a, thereby pressing the two disks 16a and 16b and the spacer ring 50 toward the disk receiving portion 48 of the hub 46. Thus, the disks 16a and 16b and the ring 50 are sandwiched between the disk receiving portion 48 and the disk clamper 56 and fixedly held in intimate contact with one another on the hub 46. The disk clamper 56 is rotated in a body with the hub 46 and the magnetic disks 16a and 16b.

As shown in FIGS. 1 to 3, the HDD comprises a stabilizer 60 that smoothes airflows in the circumferential direction of the magnetic disks 16a and 16b that are generated as the disks 16a and 16b rotate. The stabilizer 60 includes a stabilizer plate 62 and a plurality of support portions 64, e.g., three in number, and is integrally formed of a synthetic resin.

The stabilizer plate 62 is situated between the two disks 16a and 16b and opposed parallel to the surfaces of the disks with gaps therebetween. The support portions 64 protrude from the stabilizer plate 62.

The stabilizer plate 62 is in the form of a substantially rectangular plate that has a through hole 66 in its central portion. It further has a notch portion 67 that communicates with the through hole. The stabilizer plate 62 includes first, second, and third regions 62a, 62b and 62c. The first region 62a faces the respective first no-data recording regions A of the magnetic disks 16a and 16b. The second region 62b extends from the first region 62a toward the inner peripheral side of the magnetic disks and faces the respective data recording regions C of the disks 16a and 16b. The third region 62c is situated around the through hole 66 and faces the respective second no-data recording regions B of the disks.

The first region 62a is thicker than the second and third regions 62b and 62c. The second and third regions 62b and 62c are formed having the same thickness. Gaps between the first region 62a and the magnetic disks 16a and 16b are adjusted to, for example, 0.2 to 0.25 mm each, and gaps between the second and third regions 62b and 62c and the disks 16a and 16b to, for example, 0.3 mm each. Thus, the first region 62a is situated closer to the respective surfaces of the disks 16a and 16b than the second and third regions 62b and 62c. If the disks 16a and 16b or the stabilizer plate 62 vibrates heavily, the first region 62a touches the respective first no-data recording regions A of the disks, thereby restraining the second region 62b of the stabilizer plate 62 from moving toward the disks. Thus, the first region 62a prevents the second region 62b from touching the respective data recording regions C of the disks 16a and 16b. In consequence, the data recording regions can be prevented from being damaged and having their data destroyed.

The third region 62c of the stabilizer plate 62 is fitted in the groove 52 of the spacer ring 50 with a gap. If the magnetic disks 16a and 16b or the stabilizer plate 62 vibrates heavily, the third region 62c touches the spacer ring 50, thereby restraining the second region 62b of the stabilizer plate 62 from moving toward the disks. Thus, the third region 62c prevents the second region 62b from touching the respective data recording regions C of the disks 16a and 16b. In consequence, the data recording regions of the disks 16a and 16b can be prevented from being damaged and having their data destroyed.

The stabilizer plate 62 is opposed to half or more of each of the magnetic disks 16a and 16b with respect to the circumferential direction of the disks. The notch portion 67 of the stabilizer plate 62 is situated in a movement region of the carriage assembly 22, whereby the stabilizer plate 62 and the carriage assembly 22 are prevented from interfering with each other. The stabilizer plate 62 extends close to the upstream side of the carriage assembly 22 in the rotation direction of the disks 16a and 16b.

The support portions 64 of the stabilizer 60 are arranged individually on three corner portions of the stabilizer plate 62 and situated outside the magnetic disks 16a and 16b. Each support portion 64 has a first post 64a that extends from the stabilizer plate 62 and engages the bottom surface 12a of the case 10 and a second post 64b that extends from the stabilizer plate and abuts against the top cover 11. The first and second posts 64a and 64b are aligned coaxially with each other. An engaging protrusion 65 is formed on an extended end of the first post 64a. It engages each corresponding one of recesses 70 that are formed in the bottom surface 12a of the case. The support portions 64 are sandwiched between the bottom surface 12a and the top cover 11 of the case and support the stabilizer plate 62 so that the stabilizer plate 62 extends parallel to the disks 16a and 16b.

According to the HDD constructed in this manner, the stabilizer plate 62 is provided between the magnetic disks 16a and 16b and located close to the disks without interfering with the magnetic heads 32 or the carriage assembly 22. The stabilizer plate 62 can stabilize airflow on the surfaces of the disks 16a and 16b that are generated as the disks rotate. If the disks 16a and 16b rotate at high speed, therefore, the airflows that are generated near the disks can be stabilized to reduce disk flutter that is attributable to turbulence. Thus, there may be obtained an HDD in which vibration of the magnetic disks is reduced so that the heads can be positioned with improved accuracy with respect to the disks.

Figure 4:
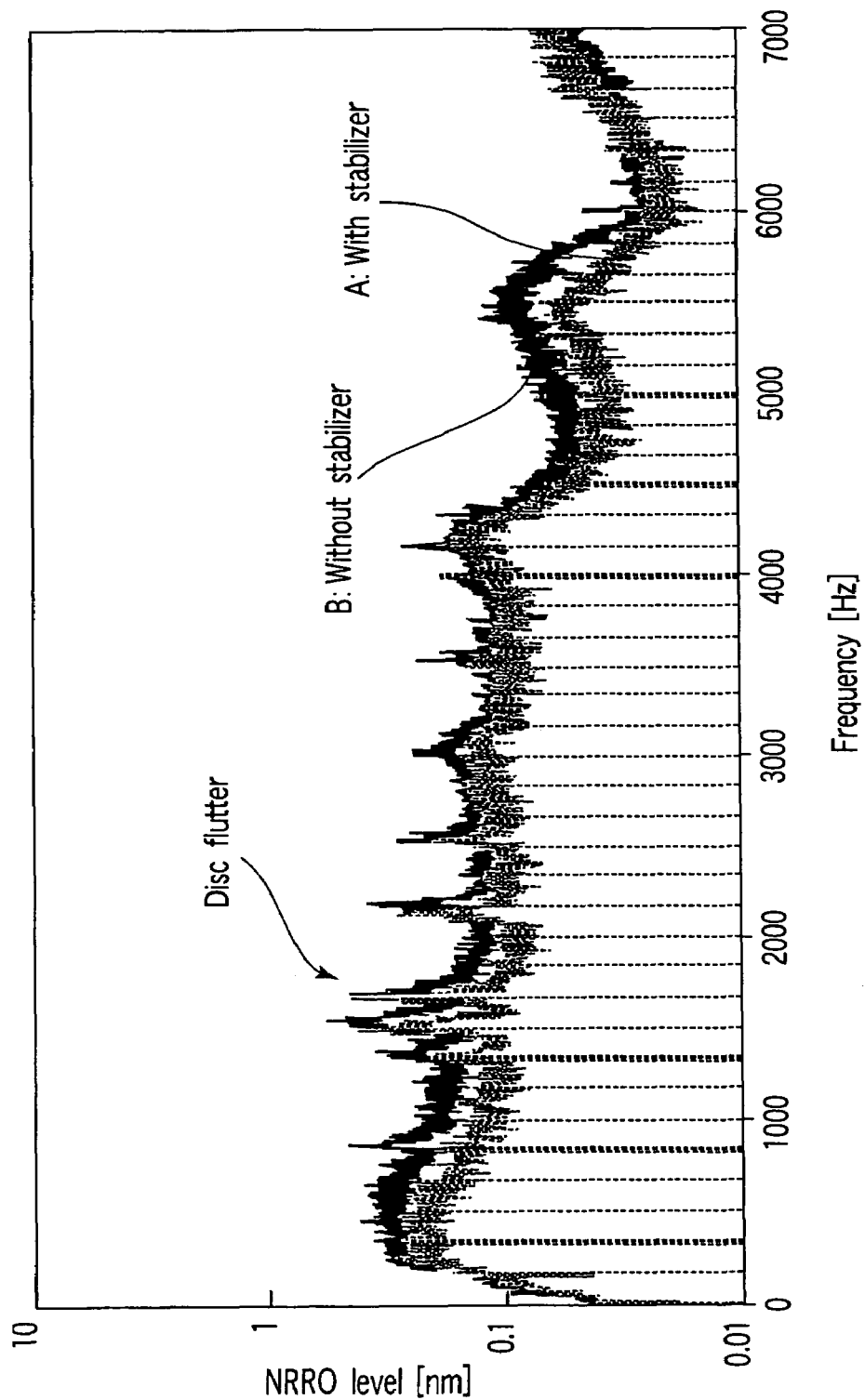
FIG. 4 is a diagram comparatively illustrating results of measurement of disk flutter on the HDD according to the first embodiment and an HDD having no stabilizer plate.

The HDD with the stabilizer plate 62 according to the first embodiment described above and a conventional HDD without any stabilizer were individually measured for the accuracy of positioning (NRRO) of their magnetic disk surfaces. NRRO (non-repetitive run-out) represents a vibration factor that is not synchronous with rotation. Off-track signals of the magnetic heads were used for the measurement of the positioning accuracy, and spectra for individual frequencies were measured with an FFT (Fast Fourier Transform) analyzer. In FIG. 4, characteristic curves A and B represent characteristics of the HDD according to the present embodiment and the conventional HDD, respectively.

In FIG. 4, the respective peaks of the spectra of characteristic curves A and B include disk flutter factors attributable to turbulence and vibration components of the carriage assembly and the suspensions. As seen from FIG. 4, the positioning accuracy of the HDD of the present embodiment, compared with that of the conventional HDD, is improved by about 20 to 30%.

According to the HDD described above, the stabilizer 60 has the three support portions 64 that support the stabilizer plate 62. The support portions 64 support the stabilizer plate in a manner such that it is sandwiched between the bottom surface 12a and the top cover 11 of the case 10. In assembling the HDD, therefore, the stabilizer 60 can be set in place without changing the conventional assembly procedure.

Thus, after the one magnetic disk 16b and the ring 50b shown in FIG. 3 are mounted on the hub 46 of the spindle motor 18 in assembly, the stabilizer 60 is put on the disk 16b so that the first posts 64a of the support portions 64 lie on the bottom surface 12a of the case. In doing this, the engaging protrusions 65 of the first posts 64a are caused individually to engage the recesses 70 of the bottom surface 12a, whereby the stabilizer 60 is positioned. Thereupon, the stabilizer plate 62 is supported opposite to the disk 16b. Subsequently, the ring 50a, magnetic disk 16a, and disk clamper 56 are mounted in succession on the hub 46. Thereafter, the top cover 11 is screwed to the base 12 so that it engages the second posts 64b of the stabilizer 60. As this is done, the support portions 64 of the stabilizer 60 are sandwiched between the bottom surface 12a and the top cover 11 of the case 10 and held in position. In this manner, the assembly is completed.

Thus, the stabilizer plate can be set between a plurality of magnetic disks by a simple assembly process such that the disks, spacer ring, and stabilizer are successively arranged. This assembly is simple because the stabilizer 60 need not be screwed. According to the HDD described above, moreover, the stabilizer plate 62 has the first and third regions 62a and 62c that serve as movement restraining portions, so that interference between the stabilizer plate and the respective data recording regions of the magnetic disks 16a and 16b can be prevented. Thus, the shock resistance that is positively required by the presence of the stabilizer plate 62 can be improved considerably.

Figure 5:
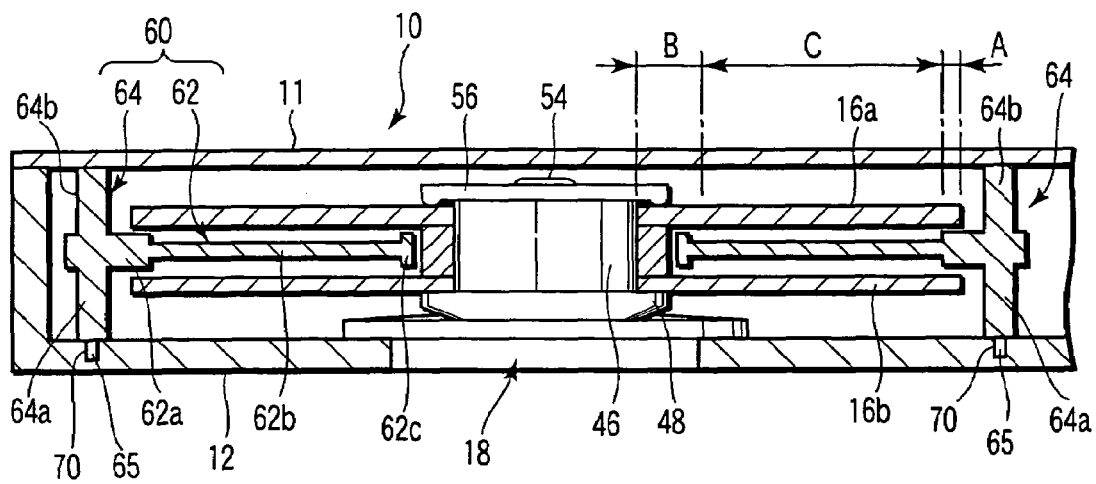
FIG. 5 is a sectional view showing an HDD according to a second embodiment of the invention.
Figure 6:
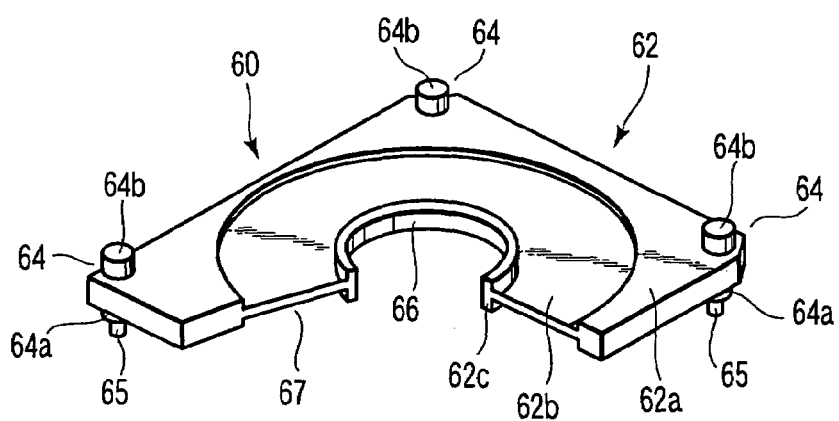
FIG. 6 is a perspective view showing a stabilizer of the HDD of the second embodiment.

The following is a description of an HDD according to a second embodiment of this invention. According to the second embodiment, as shown in FIGS. 5 and 6, a stabilizer plate 62 of a stabilizer 60 is in the form of a substantially rectangular sheet that has a through hole 66 in its central portion. It further has a notch portion 67 that communicates with the through hole. The stabilizer plate 62 includes first, second, and third regions 62a, 62b and 62c. The first region 62a faces the respective first no-data recording regions A of the magnetic disks 16a and 16b. The second region 62b extends from the first region 62a toward the inner peripheral side of the magnetic disks and faces the respective data recording regions C of the disks 16a and 16b. The third region 62c is situated around the through hole 66 and faces the respective second no-data recording regions B of the disks.

The first and third regions 62a and 62c are thicker than the second regions 62b. Gaps between the first region 62a and the magnetic disks 16a and 16b and between the third region 62c and the disks 16a and 16b are adjusted to, for example, 0.2 to 0.25 mm each. Gaps between the second region 62b and the disks 16a and 16b are adjusted to, for example, 0.3 mm each. Thus, the first and third regions 62a and 62c are situated closer to the respective surfaces of the disks 16a and 16b than the second region 62b. If the disks 16a and 16b or the stabilizer plate 62 vibrates heavily, the first region 62a touches the respective first no-data recording regions A of the disks, thereby restraining the second region 62b of the stabilizer plate 62 from moving toward the disks. Thus, the first region 62a prevents the second region 62b from touching the respective data recording regions C of the disks 16a and 16b. In consequence, the data recording regions can be prevented from being damaged and having their data destroyed.

Likewise, if the magnetic disks 16a and 16b or the stabilizer plate 62 vibrates heavily, the third region 62c touches the respective second no-data recording regions B of the disks, thereby restraining the second region 62b of the stabilizer plate 62 from moving toward the disks. Thus, the third region 62c prevents the second region 62b from touching the respective data recording regions C of the disks 16a and 16b. In consequence, the data recording regions can be prevented from being damaged and having their data destroyed.

Other configurations of the second embodiment are the same as those of the foregoing embodiment. Therefore, like reference numerals are used to designate like portions of the first and second embodiments, and a detailed description of those portions will be omitted. Further, the second embodiment can provide the same functions and effects as those of the first embodiment. In the second embodiment, the groove 52 of the spacer ring 50 may be omitted.

Figure 7:
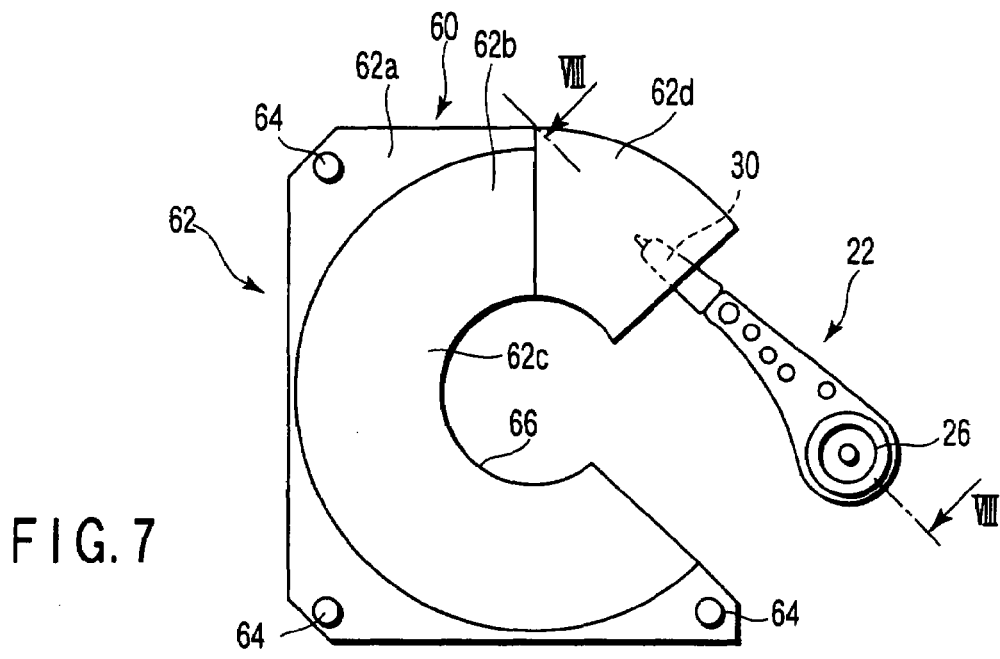
FIG. 7 is a plan view schematically showing a stabilizer and a carriage assembly of an HDD according to a third embodiment of the invention.
Figure 8:
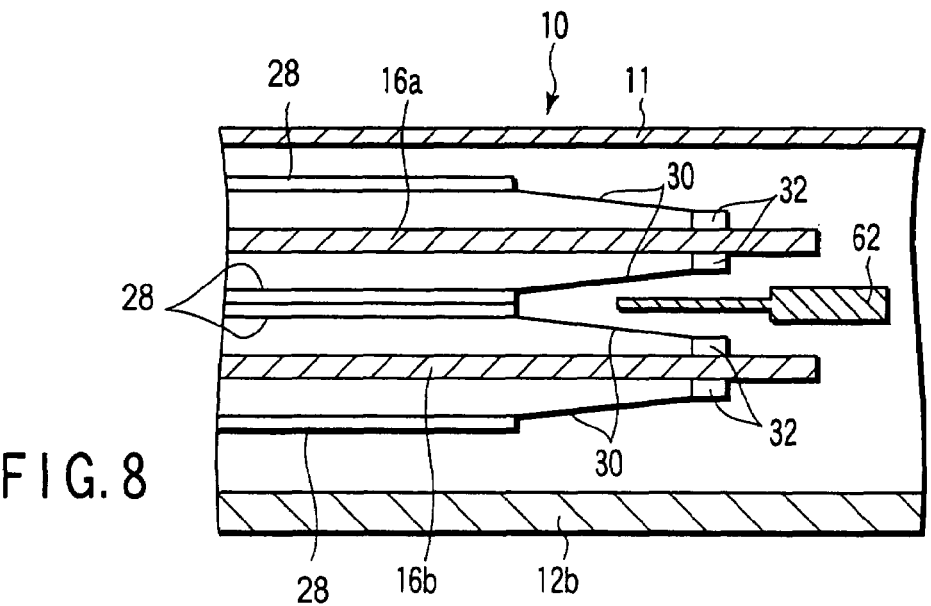
FIG. 8 is a sectional view showing the HDD of the third embodiment taken along line VIII-VIII of FIG. 7.

The following is a description of an HDD according to a third embodiment of this invention. According to the third embodiment, as shown in FIGS. 7 and 8, a stabilizer plate 62 of a stabilizer 60 integrally has a fourth region 62d, which extends between a plurality of suspensions 30 that constitutes a carriage assembly 22. The region 62d, which serves as an actuator facing region, is thinner than other regions of the stabilizer plate 62.

Other configurations of the third embodiment are the same as those of the foregoing embodiments. Therefore, like reference numerals are used to designate like portions of the first and third embodiments, and a detailed description of those portions is omitted. Further, the third embodiment can provide the same functions and effects as those of the first embodiment. According to the third embodiment, moreover, vibration of the suspensions 30 attributable to airflows can be restrained, so that magnetic heads can be positioned with improved stability.

The present invention is not limited directly to the embodiments described above, and various changes or modifications may be effected therein without departing from the scope or spirit of the invention. Further, various inventions may be made by suitably combining a plurality of components described in connection with the foregoing embodiments. For example, some of the components according to the foregoing embodiments may be omitted. Furthermore, the components according to the different embodiments may be combined as required.

Figure 9:
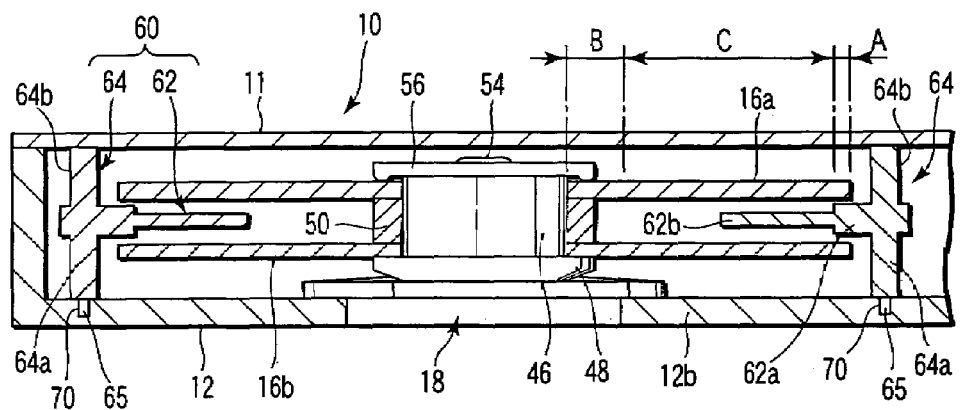
FIG. 9 is a sectional view showing an HDD according to another embodiment of the invention.

In the foregoing embodiments, the stabilizer plate 62 is configured to extend from the outer periphery from each magnetic disk to the inner periphery. Alternatively, the stabilizer plate 62 may be designed to have only first and second regions 62a and 62b without including a third region, as shown in FIG. 9. The first region 62a faces the respective first no-data recording regions A of the magnetic disks 16a and 16b. The second region 62b is directed from the first region toward the inner periphery of each magnetic disk and extends up to the middle portion of each disk. In this case, the first region 62a is thicker than the second region 62b. The same functions and effects of the first embodiment can be also obtained with this configuration. If the stabilizer plate is designed to be short in the radial direction, moreover, its vibration is so low that satisfactory vibration resistance can be secured.

Although each of the configurations according to the foregoing embodiments has been described as being provided with two magnetic disks at one time, the number of magnetic disks may be increased as required. If three or more magnetic disks are expected to be incorporated at one time, a plurality of stabilizer plates having the same configuration as aforesaid should only be successively arranged. The support portions that support the single stabilizer plate (in the case of only two disks) now support as many stabilizer plates as are needed to place one stabilizer plate in between each adjacent pair of disks. The support portions of each stabilizer may be formed separately from the stabilizer plate. Each support portion is not limited to a post and may alternatively be in the form of a sheet or block.

What is claimed is:

1. A disk drive device comprising:
   a case having a bottom surface and a cover;
   a motor having a rotatable hub and located in the case;
   a plurality of disks which are supported on the hub and rotated by the motor, each of the plurality of disks has a first no-data recording region situated at an outer peripheral edge portion, a second no-data recording region situated at an inner peripheral edge portion, and a data recording region situated between the first and second no-data recording regions;
   a plurality of heads corresponding to recordable/readable surfaces of said plurality of disks, said plurality of heads processing information for said plurality of disks; and
   a stabilizer having a stabilizer plate located between adjacent ones of the plurality of disks and opposed to surfaces of the adjacent ones of the plurality of disks with gaps therebetween and a plurality of support portions which extend from the stabilizer plate outside the plurality of disks, said plurality of support portions being sandwiched between the bottom surface and the cover of the case, and supporting the stabilizer plate, the stabilizer plate has a first region which faces the first no-data recording regions of the disks, a second region which extends from the first region toward an inner peripheral side of the disks, and a third region which faces the second no-data recording region of the plurality of disks, the first and third regions being thicker than the second region.

2. The disk drive device according to claim 1, wherein each of the plurality of support portions has a first post which extends from the stabilizer plate and engages the bottom surface and a second post which extends from the stabilizer plate and abuts against the cover.

3. The disk drive device according to claim 2, wherein the first and second posts are aligned with each other.

4. The disk drive device according to claim 2, wherein the stabilizer plate and the plurality of support portions are integrally formed.

5. The disk drive device according to claim 4, wherein the stabilizer plate and the plurality of support portions are molded from synthetic resin.

6. The disk drive device according to claim 1, wherein the first region and the third region of the stabilizer plate are sufficiently thicker than said second region of the stabilizer plate so as to prevent the second region of the stabilizer plate from touching the data recording region of the plurality of disks.

7. A disk drive device comprising:
A case having a bottom surface and a cover;
a motor having a rotatable hub and located in the case;
a plurality of disks which are supported on the hub and rotated by the motor;
a plurality of heads corresponding to recordable/readable surfaces of said plurality of disks, said plurality of heads processing information for said plurality of disks;
a stabilizer having a stabilizer plate located between adjacent ones of the plurality of disks and opposed to surfaces of the adjacent ones of the plurality of disks with gaps therebetween and a plurality of support portions which extend from the stabilizer plate outside the plurality of disks, said plurality of support portions being sandwiched between the bottom surface and the cover of the case, and supporting the stabilizer plate; and
a spacer ring attached to the motor and situated between respective inner peripheral edge portions of each of the adjacent ones of the plurality of disks, the spacer ring having a groove on an outer peripheral surface thereof, and wherein each of the plurality of disks has a first no-data recording region situated at an outer peripheral edge portion, a second no-data recording region situated at an inner peripheral edge portion, and a data recording region situated between the first and second no-data recording regions, and the stabilizer plate has a first region which faces the first no-data recording regions of the plurality of disks, a second region which extends from the first region toward an inner peripheral side of the plurality of disks, and a third region which is situated in the groove of the spacer ring with a gap therebetween, the first region being thicker than the second region.

8. A disk drive device comprising:
A case having a bottom surface and a cover;
a motor having a rotatable hub and located in the case;
a plurality of disks which are supported on the hub and rotated by the motor;
a plurality of heads corresponding to recordable/readable surfaces of said plurality of disks, said plurality of heads processing information for said plurality of disks;
a stabilizer having a stabilizer plate located between adjacent ones of the plurality of disks and opposed to surfaces of the adjacent ones of the plurality of disks with gaps therebetween and a plurality of support portions which extend from the stabilizer plate outside the plurality of disks, said plurality of support portions being sandwiched between the bottom surface and the cover of the case, and supporting the stabilizer plate; and
a head actuator which has a plurality of arms and a plurality of suspensions extending from the arms and each supporting one of said plurality of heads for movement with respect to the plurality of disk, and wherein the stabilizer plate is opposed to half or more of each of the plurality of disks with respect to the circumferential direction of the disks, exclusive of a region of movement of the head actuator relative to the plurality of disks.

9. A disk drive device comprising:
A case having a bottom surface and a cover;
a motor having a rotatable hub and located in the case;
a plurality of disks which are supported on the hub and rotated by the motor;
a plurality of heads corresponding to recordable/readable surfaces of said plurality of disks, said plurality of heads processing information for said plurality of disks;
a stabilizer having a stabilizer plate located between adjacent ones of the plurality of disks and opposed to surfaces of the adjacent ones of the plurality of disks with gaps therebetween and a plurality of support portions which extend from the stabilizer plate outside the plurality of disks, said plurality of support portions being sandwiched between the bottom surface and the cover of the case, and supporting the stabilizer plate; and
a head actuator which has a plurality of rotatable arms and a plurality of suspensions extending from the rotatable arms and each supporting one of the plurality of heads for movement with respect to the plurality disk, and wherein the stabilizer plate has an actuator facing region which extends between the plurality of suspensions and is thinner than other regions of the stabilizer plate.

* * * * *